United States Patent [19]

Sano

[11] Patent Number: 4,837,302

[45] Date of Patent: Jun. 6, 1989

[54] CROSS-LINKED RESIN FROM BIS(2-OXAZOLINE) AND AROMATIC COMPOUND CONTAINING TWO AMINO GROUPS

[75] Inventor: Yasuo Sano, Minoo, Japan

[73] Assignee: Takeda Chemical Industries, Ltd., Osaka, Japan

[21] Appl. No.: 111,513

[22] Filed: Oct. 21, 1987

[30] Foreign Application Priority Data

Nov. 4, 1986 [JP] Japan .................... 61-263390

[51] Int. Cl.$^4$ ............................................. C08G 73/00
[52] U.S. Cl. .................................. 528/407; 528/210; 528/211; 528/327; 528/331; 528/406; 528/423
[58] Field of Search ............... 528/407, 210, 211, 423, 528/406, 327, 331

[56] References Cited

U.S. PATENT DOCUMENTS 4,600,766  7/1986  Arita et al. .................... 528/423

Primary Examiner—Harold D. Anderson
Attorney, Agent, or Firm—Wenderoth, Lind & Ponack

[57] ABSTRACT

A cross-linked resin as obtained by the reaction of a bis (2-oxazoline) compound with an aromatic compound having at least two amino groups shows low water-absorption, excellent in strength, and, in addition, tough and superior in heat-resistance.

The resin composition comprising the cross-linked resin and reinforcements and/or fillers can be especially advantageously utilized for preparing a variety of molded articles practically usable in a broad application field, for example, space, aircraft, railway vehicles, automobiles, civil engineering, electrical and electronic appliances, cross-resistant equipment, sports and leisure equipment, medical equipment and industrial parts, as well as in the new application areas where conventional fiber-reinforced resins have hardly been utilized by the reason of insufficient strength, water-absorption, heat-resistance, etc.

9 Claims, No Drawings

CROSS-LINKED RESIN FROM BIS(2-OXAZOLINE) AND AROMATIC COMPOUND CONTAINING TWO AMINO GROUPS

The present invention relates to a cross-linked resin and a process for producing the said cross-linked resin. The resin obtainable by the present invention is tough and excellent in thermal resistance, thus being utilizable in the preparation of various molded articles.

It has been known, as referred to in the specification of U.S. Pat. No. 3,476,712, that the reaction of a bis(2-oxazoline) compund with a dicaboxlic acid in a substantially equimolar amount under heating produces linar polyesteramide which is not cross-linked. It has also been known, as described in the specification of U.S. Pat. No. 4,474,942, that the reaction of a bis(2-oxazoline) compund in a not less than about equimolar amount relative to dicarboxylic acid under heating in the presence of a catalyst such as organic phosphite produces cross-linked resin.

On the other hand, it is described, in the specification of U.S. Pat. No. 4,439,491, that the reaction of a bis(2-oxazoline) compound with a compound having in its molecule two phenolic hydroxyl groups produces a thermo-plastic resin, and that the reaction of a bis(2-oxazoline) compund with a compound having in its molecule three or more hydroxyl groups or a phenol-formaldehyde precondensate under heating causes ring-opening addition of the oxazoline ring to the phenolic hydroxyl groups to produce a thermosetting resin.

And, in Toku-Kai Sho 60-90219 (Pubication of Unexamined Patent Application No. 60-90219), it is described that the reaction of at least one selected from the group consisting of sulfonamide, a derivative thereof, acid amide, aromatic oxyacid and a bispheno sulfonic compound with a bis(2-oxazoline) compound under heating produces a thermosetting resin. And, reference to the reaction of a mono(2-oxazoline) compound with monoamine is made in the specification of U.S. Pat. No. 4,326,067 and in Journal of Organic Chemistry, Vol. 49, p.4889, and, it is known that aminoethyl amide is produced by using a metal salt catalyst. And, according to the specification of U.S. Pat. No. 4,014,880, the reaction of a mono(2-oxazoline) compound with diamine produces imidazole. However, it has not been known at all that the reaction of a bis-oxazoline compound with a diamine compound produces a resin of cross-linked structure.

The object of the present invention is to provide a novel crosslinked resin by allowing a bis(2-oxazoline) compound to react with an aromatic compound having at least two amino groups.

The present inventors have been conducting for many years studies on the production of thermo-setting resin using a bis(2-oxazoline) compound, and have found that by the use of a basic aromatic compound having at least two aromatic groups, instead of an acidic compound, e.g. dicarboxylic acid, a compound having two phenolic hydroxyl groups in the molecule, sulfonic acid amide or a derivative thereof, acid imide, an aromatic oxyacid or a bisphenol sulfone compound, as described in the above section "Prior Art", thermo-setting resin can be obtained. And, the present inventors have further found that the thermosetting resin thus-obtained is though, excellent in thermal resistance and low in water absorption. Based on these findings, the present invention has been accomplished.

The present invention relates to a cross-linked resin, which is prepared by the reaction of a bis(2-oxazoline) compound with an aromatic compound having at least two amino groups and to a process for producing the said cross-linked resin.

The bis(2-oxazoline) compound used in the present invention is represented by the general formula:

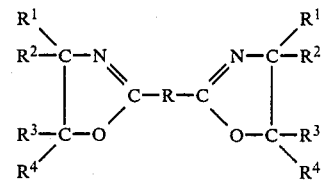

[wherein R stands for a carbon-carbon linkage or a divalent hydro-carbon group, and $R^1$, $R^2$, $R^3$ and $R^4$ independently represent hydrogen, an alkyl group or an arly group], and, when R is a hydrogen group, it is exemplified by an alkylene group, a cycloalkylene group or an arylene group, etc. Examples of such bis(2-oxazoline) compounds, when R is a carbon-carbon linkage, include 2,2'-bis2-oxazoline), 2,2'-bis(4-methyl-2-oxazoline), 2,2'-bis(5-methyl-2-oxazoline), 2,2'-bis(5,5'-dimethyl-2-oxazoline), 2,2'-bis-(4,4',4'-tetramethyl-2-oxazoline), etc. Examples of the compounds, when R is a hydrocarbon group, include 1,2-bis(2oxazolin-2-yl)ethane, 1,4-bis(2-oxazolin-2-yl)butane, 1,6-bis(2-oxazolin-2-yl)hexane, 1,8-bis(2-oxazolin-2-yl)octane, 1,4-bis(2-oxazolin-2-yl)cyclohexane, 1,2-bis(2-oxazolin-2-yl) benzene, 1,3-bis(2-oxazolin-2-yl)benzene, 1,4-bis(2-oxazolin-2-yl)benzene, 1,2-bis(5-methyl-2-oxazolin-2-yl)benzene, 1,3-bis(5-methyl-2-oxazolin-2-yl)benzene, 1,4-bis(5-methyl-2-oxazolin-2-yl)benzene, 1,4-bis(4,4'-dimethyl-2-oxazolin-2-yl)benzene, etc. These may be used singly or as a combination of two or more species.

The aromatic compound having at least two amino groups, which is usable in the present invention, includes, for example, those in which two amino groups are bonded to one benzene ring, poly-cyclic compounds having two or more benzene rings in which two amino groups are bonded or three or more amino groups are bonded. Practical examples of these aromatic compounds include o-, m- and p-phenylenediamine, 2,4-toluylenediamine, 2,3-toluylenediamine, 2,5-toluylenediamine, 4,4'-diamaniobiphenyl, 3,3'-diamethoxy-4,4'-diamiobiphenyl, 4,4'-diamiontriphenylmethane, 3,3'-dimethyl-4,4'-biphenyl, 2,2',5,5'-tetrachloro-4,4'-diaminobiphenyl, 4,4'-methylenebisaniline, 4,4'-methyenebis(2-chloroaniline), 2,2-bis[4-(4-aminophenoxy)phenyl]propane, 1,3-bis(4-aminophenoxy)benzene, 1,3-bis(3-aminophenoxy)benzene, 3,4'-diaminodiphenylether, 4,4'-diamino-diphenyl sulfide, 4,4-bisaminodiphenylamine, etc. These may be used singly or as a mixture of two or more species.

Among the above-mentioned compounds, are especially preferable 4,4'-menthylenebis aniline, 4,4'-methylenebis(2-chloroaniline), 1,3-bis(4- aminophenoxy)benzene, 3,4'-diaminodiphenylether, 4,4'-diaminodiphenylsulfide, 2,2-bis[4-(4-aminophenoxy)phenyl]propane, etc.

The amount of an aromatic compound having at least two amino groups is aboud 1.25 mole or less relative to 1mole of a bis(2-oxazoline)compound, especially preferably in the range of about 1 to 0.25 mole.

According to the present invention, by allowing a bis(2-oxazoline) compound to react with an aromatic compound having at least two amino groups, cross-linked resin is obtained. In carrying out this reaction, use of such an oxazoline ring opening polymerization catalyst as described in, for example, "Polymer J., Vol. 3, No. 1, pp. 35-39 (1972)" and "Polymerization Reaction Treatise Course 7, Ring-Opening Polymerization II, p.p.159-164, Kagaku Dojin (1973)", serves to lower the reaction temperature and shorten the reaction time, thus being preferable. Practical examples of the oxazoline ring-opening polymerization catalyst include a strong acid, sulfonic acid ester, sulfuric acid ester, an organic halide having at least one halogen atom attached to an alkyl carbon in the molecule and a Lewis acid.

Examples of the strong acid include an oxyacid such as phosphoric acid, sulfuric acid, nitric acid, etc., a mineral acid of hydrogen such as hydrochloride acid, hydrobromic acid, hydriodic acid, hydrogen, sulfide, etc., and an organic acid such as phenylphosphoric acid, methanesulfonic acid, benzenesulfonic acid, p-toluenesulfonic acid, dodecylbenzenesulfonic acid, naphthalene-α-sulfonic acid, naphthalene-β-sulfonic acid, sulfanilic acid, phenylsulfonic acid, etc. The strong acid be added in the form of a free acid or its salt with an aromatic mono amino compound. Examples of the aromatic mono amino compound include aniline, methyaniline, ethylaniline, o-toluidine, m-toluidine, p-toluidine, benzylamine, α-naphthylamine, β-naphthylamine, etc.

Examples of the sulfonic acid ester include methyl p-toluenesulfonate, ethyl p-toluensesulfonate, n-butyl p-toluensesulfonate, etc.

Examples of the sulfuric acid ester include dimethylsufuric acid, diethylsulfuric acid, etc.

Preferred examples of the organic halide include monohaloalkane and polyhaloalkane, which are specifically exemplified by methyl iodide, butyl chloride, butyl bromide, n-hexyl bromide, butyl iodide, lauryl bromide, n-octyl bromide, stearyl bromide, allyl bromide, ethane tetrabromide, etc. Preferred examples other than the above-mentioned organic halides are mono- or polyhalomethylbenzene such as benzyl bromide, p,p'-dichloromethylbenzene, α-bromopropionic acid ester, α-bromoisobutyric acid ester, etc.

The Lewis acid is exemplfied by aluminium chloride, stannic chloride, vanadium chloride, vanadyl chloride, boron trifluoride etherated, etc.

These catalysts may be used singly or as a mixture of two or more species of them, which are employed in amounts of about 0.05 to 3% by weight, preferably about 0.1 to 2% by weight based on the weigh of the mixture of a bis(2-oxazine) compound and an aromatic compound having at least two amino groups.

In the method of the present invention, the reaction temperature depends on, besides the catalyst used and the amount thereof, the starting resin material. It is, however, usually not lower than 80° C., preferably in the range of from 100° C. to 300° C., especially preferably in the range of from 100° C. to 200° C. The reaction also varies depending on the reaction temperature, the kinds and amounts of the catalysts used, the starting materials, ratios thereof to be employed, etc., but usually in the range of about one minute to about one hour.

According to the present invention, cross-linked resin incorporated with a reinforcement and/or a filler is also obtainable. As the reinforcement, a fiber reinforcement usable for conventional fiber-reinforced resins is preferably employed. Practical examples of the reinforcements include inorganic fibers such as glass fiber, carbon fiber, quartz fiber, ceramic fiber, zirconia fiber, boron fiber, tungsten fiber, molybdenum fiber, stainless steel fiber, berylium fiber, asbestos fibers, etc., natural fibers such as cotton, flax, hemp, jute, sisal hemp, etc. and heat-resistance organo-synthetic fibers such as polyamide fiber, polyester fiber, etc. In order to improve adhesive force to the resin, the fiber reinforcements may be treated in advance with, for example, methacrylated chromic chloride, silane, vinyltriethoxysilane, aminosilane, etc. These fiber reinforcements can be used singly or in combination of two or more of them. And, these fiber reinforcements are not limited whatsoever in the form, can can be used in various forms, for example, braid, mat, tape, short fiber cut to a given uniform length. These fiber reinforcements may in a composite form of the above-mentioned forms.

The amount of these fiber reinforcements can be suitably selected depending on the melting points of the material resins containing a catalyst, kinds of the reinforcements employed, types thereof, uses of the reinforced resins as finished products, etc., and normally, it is in the range of about 3 to 95 weight %, preferably about 5 to 80 weight %.

As the fillers, those which have been conventionally used in the field of molding of synthetic resins. Practical examples of these fillers include oxides e.g. silica, alumina, titanium oxide, etc., hydroxides e.g. aluminium hydroxides, etc., carbonates, e.g. calcium carbonate, magnesium carbonate, etc., silicates e.g. talc, clay, glass beads, bentonite, etc., carbon e.g. carbon black, etc., metal powder e.g. iron powder, aluminium powder, etc., and so forth. The amount of the fillers to be incorporated can be suitably selected like in the case of fiber reinforcements, and it is usually in the range of about 3 to 95 weight %, preferably about 10 to 80 weight %.

And, in the method of the present invention, in addition to the above-mentioned fiber reinforcements and fillers, may be incorporated optional additives such as stabilizers, internal mold-releasing agents, pigments, etc., which are used in ordinary thermosetting resin molding.

For obtaining cross-linked resins containing such fiber reinforcements or fillers as mentioned above, according to the present invention, a resin material which is a mixture of a bis(2-oxazoline) compound, an aromatic compound having at least two amino groups, a catalyst, and, depending on necessity, above-mentioned substituted compounds, preferably the mixture being molten into homogeneous one, is mixed with a reinforcement and/or a filler, or the above-mentioned mixture is impregnated into a reinforcement and/or a filler, followed by heating.

Especially, for obtaining fiber-reinforced cross-linked resin, various conventional procedures in the production of glass-fiber reinforced thermosetting resins can be optionally adopted. More concretely, there may be mentioned, for example, Preform·Matched Metal Die Method or Resin Injection Method, which comprises injecting or impregnating a resin material containing a catalyst into a fiber reinforcement placed in advance in a metal mold for forming under heating and elevated pressure, followed by curing under heating; Bulk Molding Compound, Transfer Method, Injection Molding Method, Reacive-Injection-Molding Method (RIM), which comprises placing or injecting a kneaded material consisting of a resin material containing a catalyst and a fiber reinforcement cut to a give uniform size into a metal mold for foming under heating and elevated pressure, followed by curing under heating; SMC Method, Prepreg·Cloth Method or Filament Wilding Method, which comprises impregnating a fiber reinforcement with a resin material containing a catalyst to yield a tack-free prepreg molding material.

For obtaining the cross-linked resins containing the fiber reinforcements and fillers described as above, the molding temperature is usually in the range of about 130° C. to 230° C. The heat-curing time is dependent on the king and amount of catalyst, species of the bis(2-oxazoline) compound, the compound having at least two amino groups, the catalyst and its amount, molding temperature, etc., and is usually in the range of one minute to one hour.

Especially, the fiber-reinforced resing obtained according to the method of the present invention are reinforced while retaining excellent mechanical properties and heatresistant properties possessed by the matrix resins, and they are suitable for preparing a variety of molded articles practically usable in a broad application field, for example, space, aircraft, railway vehicles, automobiles, civil engineering, electrical and electronic appliances, cross-resistant equipment, sports and leisure equipment, medical equipment and industrial parts, as well as in the new application areas where conventional fiber-reinforced resins have hardly been utilized by the reason of insufficient strength, waterabsorption, heat-reistance, etc.

(Effects of the Invention)

According to the method of the present invention, by allowing a bis(2-oxazoline) compound to react with an aromatic compound having at least two amino groups under heating in the presence of a given catalyst, a cross-linked resin, which is insoluble and infusible, solid and low in water-absorption, excellent in strength, and, in addition, tough amd superior in heat-resistance, can be obtained.

Also, according to the method of the present invention, there is no substantial influence of moisture in the heating reaction. Therefore, the method of the present invention is especially advantageous for preparing resin compositions containing reinforcements and/or fillers, during the reaction for which there is a relatively large possibility of moisture being introduced. The resin compositions obtained by the present invention can be especially advantageously utilized for preparing a variety of molded articles in which the characteristic properties are made use of.

Working Examples

The present invention will be illustrated by the following examples without being limited thereto. In the examples, the deflection temperature under load was measured under a load of 18.5 kg/cm$^2$ applied to a sample cured resin sheet of about 3 mm thick, and the water absorption rate is the increase in weight (%) of a cured sheet of about 3 mm thick in the form of disc after immersing in water at 23° C. for 24 hours.

EXAMPLE 1

A 52.17 g (0.241 mole) quantity of 1.3-bis (2-oxazolin-2-yl) benzene and 47.83 g (0.241 mole) of 4,4'-methylenebis aniline were placed in a beaker. the beaker was heated on a bath of 130° C. to dissolve the content. The mixture became a clear solution when the inner temperature reach about 110° C. To the solution was added 1.0 g of methyl p-toluenesulfonate, and the mixture was stirred. Then, the mixture was poured into a plate mold having a spacer of about 3 mm width, the mold having been heated in advance in an oven of 160° C. , which was then left standing in an oven at 160° C. for 10 minutes to allow the mixture to be cured. The properties of the resulting resin sheet were as follows.
Load deflection temperature 126° C.
Flexural strength 18.6 kgf/mm$^2$
Flexural modulus 410 kgf/mm$^2$
Barcol hardness 31.5
Water absorption 0.20%

EXAMPLES 2 to 4

By following the same procedure as in Example 1, excepting that the molar ration of 4,4'-methylenebis aniline relative to 1 mole of 1,3-bis(2-oxazolin-2-yl) benzene was changed variously, insoluble and infusible resin sheets were obtained, whose properties were as in the following table.

|  | Example | | |
| --- | --- | --- | --- |
|  | 2 | 3 | 4 |
| Molar ratio of 4,4'-methylenebis aniline | 0.83 | 0.67 | 0.50 |
| Load deflection temperature (°C.) | 150 | 183 | 216 |
| Flexural strength (kgf/mm$^2$) | 21 | 19 | 16 |
| Flexural modulus (kgf/mm$^2$) | 405 | 400 | 440 |
| Izod impact strength (kgf · cm/cm) | 9.2 | 9.7 | — |
| Barcol hardness | 37.5 | 41.5 | 51 |
| Water absorption (%) | 0.22 | 0.25 | 0.28 |

EXAMPLE 5

A 46.6 g (0.216 mole) quantity of 1.3-bis(2-oxazolin-2-yl)benzene and 53.4 g (0.27 mole) of 4,4'-methlylenebisaniline were placed in a beaker. The beaker was heated on a water bath of 130° C. The mixture became a clear solution, when the inner temperature reached about 110° C. to the solution was added 0.3 g of methyl p-toluene sulfonate, and the mixture was stirred. Then, the mixture was poured into a plate mold having a spacer of about 3 mm width, which was heated in an oven at 150° C. for 30 minutes to give a transparent yellow plate of about 3 mm thick, which was insoluble and infusible.

EXAMPLE 6

A 34 g (0.157 mole) quantity of 1,3-bis(2-oxazolin-2-yl)benzene and 26 g (0.131 mole) of 4,4'-methylenebisaniline were placed in a beaker. To the mixture was added each of the following catalysts, and the mixture was heated on an oil bath of 160 to 165° C. for one hour to give an insoluble and infusible cured material. ethyl -toluensesulfonate (0.3%), butyl p-toluenesulfonate (0.5%), lauryl bromide (0.7%), butyl iodide (0.7%), monochloroacetate (0.7%), n-octyl bromide (0.3%), sulfuric acid (0.7%), 35% hydrochloric acid (1.5%), boron trifluoride etherate (0.7,), anhydrous aluminium chloride (1.5,), aluminium chloride hexahydrate (2%), dimethyl sulfate (0.7%) vanadium trichloride (2.0%), vanadyl chloride (1.5%)

EXAMPLE 7

A 38.9 g (0.18 mole) quantity of 1,3-bis(2-oxazolin-2-yl)beneze was mixed with mixed with 61.1 g (0.15 mole) of 2,2-bis [4 -(4-aminophenoxy)phenyl]propane. The mixture was dissolved on a bath of 150° C. To the solution was added 0.3 g of methyl p-toluensesulfonate, and the mixture was stirred, followed by pouring into a metal mold which had beeen heated in advance. The mold was placed in an oven at 160° C. for 30 minutes to cure the mixture. The properties of the resulting cured sheet of about 3 mm thick were as follows.

Load deflection temperature 151° C.
Flexural strength 18.4 kgf/mm$^2$
Flexural modules 330 kgf/mm$^2$
Water absorption 0.14 %

EXAMPLES 8 to 11

Using the starting materials set forth in the following table (molar ratio of the bisoxazoline compound and the diamino compund in each Example is 1:0.83), the same procedure as in Example 7 was followed to give the cured sheets having respectively the following properties.

| Example | Starting Materials | |
|---|---|---|
| 8 | 1,3-bis(2-oxazolin-2-yl)benzene | 47.02 g |
|   | 1,3-bis(4-aminophenoxy)benzene | 52.97 g |
| 9 | same oxazoline compound as above | 56.44 g |
|   | 3,4'-diaminodiphenylether | 43.56 g |
| 10 | same oxazoline compound as above | 54.5 g |
|    | 4,4'-diaminodiphenylsulfide | 45.4 g |
| 11 | same oxazoline compound as above | 49.27 g |
|    | 4,4'-methylene-bis(2-chloroaniline) | 50.73 g |

| | Properties of the Cured Sheet | | | |
|---|---|---|---|---|
| Example | Load deflection temperature | Flexural strength | Flexural modulus | Water absorption |
| 8 | 138° C. | 19 kgf/mm$^2$ | 370 kgf/mm$^2$ | 0.11% |
| 9 | 147 | 22 | 400 | 0.12 |
| 10 | 154 | 20 | 370 | 0.12 |
| 11 | 149 | 24 | 410 | 0.07 |

EXAMPLE 12

A 46.6 g (0.216 mole) quantily of 1,3-bis(2-oxazolin-2-yl)benzene and 53.4 g (0.27 mole) of 4,4'-methylenebisaniline were placed in a beaker. The beaker was heated on a bath of 130° C. to dissolve the content. To the solution was added 0.3 g of methyl p-toluenesulfonate, and the mixture was stirred. The resultant solution was poured onto eight ply layers of continuous strand mat (M-8609 manufactured by Asahi Fiber Glass Co., Ltd.) put on a press plate set at 160° C. The mold was closed, which was left standing for ten minutes to allow the curing to proceed, whereby a fiber-reinforced cured sheet (18 cm square, 3 mm thick) was obtained. Properties of this FRP (glass-content :73.8%) were as follows. Tensile strength 34 kgf/mm$^2$; Tensile modules 2350 kgf/mm$^2$ ; Tensile elongation 2.20%; Flexural strength 47 kgf/mm$^2$; Flexural modulus 1810 kgf/mm$^2$; Compressive strength 32 kgf/mm$^2$ Izod impact strength 90 kgf·cm/cm; Water absorption 0.11%

EXAMPLE 13

Employing twice each as much amount of the starting materials as those in Example 12, a material solution was prepared in accordance with the same procedure as in Example 12. This solution was poured onto 14 ply layers of a plain glass-cloth (WE 22D 104BX, produced by Nitto Boseki Co., Ltd.). The cloth was impregnated with the solution by means of a roller under the coverage of a Teflon sheet. The resultant was once left standing for cooling to give a prepreg sheet, followed by subjectin to mold-clusure for 30 minutes with a pressing machine set at 160° C. to obtain a cured material. The physical properties of the thusobtained FRP (glass-content : 56.6%) are as follows.

Tensile strength 37 kgf/mm$^2$
Tensile modules 2040 kgf/mm$^2$
Tensile elongation 2.03%
Flexural strengh 50 kgf/mm$^2$
Flexural modulus 1950 kgf/mm$^2$
Compressive strength 49 kgf/mm$^2$
Compression modulus 1890 kgf/mm$^2$

EXAMPLE 14

A 45.4 g (0.210 mole) quantily of 1,3-bis(2-oxazolin-2-yl)benzen and 34.7 g (0.175 mole) of 4,4'-methylenebisaniline were placed in a beaker. To the mixture was added each of the following catalysts, and the mixture was heated on an oil bath of 120° C. to give an insoluble and infusible cured material.

Catalysts: aniline hydroiodide (0.46 g), octyl iodide (0.50 g), aniline hydrobromide (0.36 g), ethyl α-bromopropionate (0.385 g), ethyl αbromoisobutyrate (0.41 g), cyclohexyl iodide (0.44 g)

EXAMPLE 15

A 45.4 g (0.210 mole) quantity of 1,3-bis(2-oxazolin-2-yl)benzene and 34.7 g (0.175 mole) of 4,4'-methylenebisaniline were placed in a beaker. To the mixture was added each of the following catalysts, and the mixture was heated on an oil bath of 160° C. to give an insoluble and infusible cured material.

Catalysts: cyclohexyl bromide (0.34 g), aniline hydrochloride (0.27 g), octyl chloride (0.13 g)

What is claimed is:

1. A cross-liniked resin which is prepared by the reaction of bis (2-oxazoline) compound with an aromatic compound having at least two amino groups, wherein the amount of said aromatic compound having at least two amino groups is about 1.25 mole or less relative to 1 mole of the bis (2-oxazoline) compound and the rection is carried out in the presence of an oxazoline ring opening catalyst.

2. The cross-linked resin as claimed in claim 1 wherein the bis (2-oxaloine) compound is one represented by the general formula:

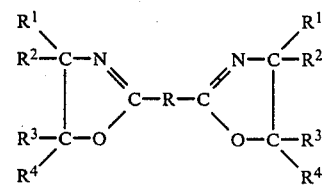

wherein R represents, a carbon-carbon linkage or R is a divalent hydrocarbon group, and R$^1$, R$^2$, R$^3$ and R$^4$ independently represent hydrogen, and alkyl group or an arly group.

3. The cross-linked resin as claimed in claim 1, wherein the bis (2-oxazoline) compound is 1,3-bis (2-oxazolin-2-yl) benzene.

4. The cross-linked resin as claimed in claim 1, wherein the aromtatic compound having at least two amino groups is 4,4'-methylene bis aniline or 2,2-bis[4-(4-aminophenoxy)phenyl]propane 5. A process for producing a cross-linked resin which comprises reacting a bis(2-oxazoline) compound with an aromatic compound having at least two amino groups.

6. The process as claimed in claim 5, wherein the amount of and aromatic compound having at least two amino groups is about 1.25 mole or less relative to 1 mole of a bis (2-oxazoline) compound.

7. A resin composition comprising a cross-linked resin which is prepared by the reaction of a bis (2-oxazoline) compound with an aromatic compound having at least two amino groups and about 3 to 95 weight % of at least one member selected from a fiber reinforcement, a filler, or mixtures thereof.

8. A process as claimed in claim 5 where the reaction is carried in the presence of an oxazoline ring opening catalyst.

9. A process as claimed in claim 5 wherein the reaction is carried out at a temperature not lower than 80° C.

* * * * *